UNITED STATES PATENT OFFICE.

MAURICE BOUVIER, OF LYON, FRANCE, ASSIGNOR TO SOCIETE CHIMIQUE DES USINES DU RHONE (ANCIENNEMENT GILLIARD P. MONNET ET CARTIER), OF PARIS, FRANCE.

DYESTUFFS OF THE INDIGO SERIES.

1,412,038.     Specification of Letters Patent.     Patented Apr. 11, 1922.

No Drawing.     Application filed July 29, 1920. Serial No. 399,823.

*To all whom it may concern:*

Be it known that I, MAURICE BOUVIER, of 25 Cours Gambetta, Lyon, France, a citizen of the Confederation of Switzerland, have invented certain new and useful Improvements in Dyestuffs of the Indigo Series, of which the following is a specification.

The dimethyl-indigo, the methyl groups of which are in the para position with respect to the imino group, is derived either from the 1-nitro-4-methyl-6-benzaldehyde by condensation of the latter with acetone in an alkaline medium (J. Koetschet, Revue des Matieres Colorantes, Vol. 5, p. 160, 1900), or from the alkaline melting of para-tolyl-glycine by the modified Heumann process. This colouring matter has not been adopted in practice owing to the dull shades with which it dyes wool or cotton.

The applicant has discovered that the properties of the said colouring matter are entirely modified by the introduction of one or two atoms of a halogen.

The halogenation can be performed by any one of the known methods. Several of such methods are given, for instance, by Richter, Traite de Chimie Organique Vol. 11, Paris, 1918, such as direct halogenation of indigo in the absence of water, in a hot benzenic solution, in concentrated sulphuric acid solution or in cold chlorsulphonic acid.

The p-p'-tolyl-dibromindigo-(5-5'-dimethyl-dibromindigo) has the appearance of a dark blue powder similar to the p-p'-tolyl-indigo. Its trace has a beautiful coppery sheen. Its properties are as follows:

| In solution in— | Colour of the solution. |
| --- | --- |
| Cold concentrated sulphuric acid. | Green. |
| Hot concentrated sulphuric acid at 100° C. | Bluish green, sulphonated with difficulty. |
| Cold aniline | Green. |
| Boiling aniline | Very sharp blue. |
| Cold nitrobenzene | Blue, slightly greenish. |
| Boiling nitrobenzene | Blue, purple by transmitted light. |
| Chloroform | Little soluble, blue, slightly green. |
| Acetone | Little soluble, blue, slightly purple. |
| Benzene | Little soluble, purple blue. |
| Alcohol | Little soluble, blue green. |
| Carbon tetrachloride | Little soluble, purple blue. |
| Carbon sulphide | Little soluble, blue. |
| Acetic acid | Blue. |
| Hydrosulphite vat | Greenish yellow. |

It is reduced by hyposulphite of soda in an alkaline solution in a similar manner to p-p'-dimethyl-indigo. But it behaves in an entirely different manner towards textile fibres, vegetable and animal.

The product is a dye both for cotton and for wool. It is therefore only to be compared with the ordinary di- and tri- bromindigos, the higher derivatives not being adapted to dye animal fibres.

On cotton the shades it gives are of a very decided and sharp blue less reddish than those given by the dibromindigo and very different from those of the tribromindigo, which are very greenish. It covers and unites very well, its affinity is to be compared to that of the tribromindigo, which is very good, it is very superior to that of the dibromindigo.

While the di- and tri- bromindigos have but little sheen on cotton, our product has a relatively strong sheen similar to that of the tetrabromindigo (Ciba 2 B blue).

On wool it is still more remarkable than on cotton, the dyes obtained by its means are extraordinarily sharp, its affinity exceeds that of the dibromindigo, which is considered as being very good and which is the best of the series of the ordinary indigos; it exceeds also that of its orthomethylated isomer. It dyes wool in the darkest shades in one dip, the tints are comparable in sharpness with those of the finest acid dyes (Alizarin Blue, for instance). The p-tolyl-bromindigo dyes wool in the same tone as cotton, which is not quite attained with di-bromindigo and far from being the case with tribromindigo.

To sum up, the introduction of the halogen in the molecule of the p-p'-dimethylindigo enhances considerably its affinity for wool and for cotton, as well as its colouring power, it modifies the shade of the tints and renders them more sharp and decided.

The monobrominated derivative has similar properties, but less developed, being intermediate between those of the p-p'-dimethylindigo and those of the derivative above described.

What I claim and desire to secure by Letters Patent is:—

1. As an article of manufacture, a halogenated derivative of p-p'-dimethylindigo.

2. As an article of manufacture, the p-p'-tolyl-dibromindigo.

In testimony whereof I have signed my name to this specification.

MAURICE BOUVIER.